United States Patent [19]

Atherton

[11] 4,032,187

[45] June 28, 1977

[54] ENERGY ABSORBING JOINT FOR PROTECTIVE FRAME

[75] Inventor: Ralph R. Atherton, Milwaukee, Wis.

[73] Assignee: Allis-Chalmers Corporation, Milwaukee, Wis.

[22] Filed: Dec. 22, 1975

[21] Appl. No.: 643,316

[52] U.S. Cl. ............................. 296/102; 280/756
[51] Int. Cl.² ............................................ B62D 25/00
[58] Field of Search ................ 280/756; 296/102; 188/1 C; 403/41

[56] References Cited

UNITED STATES PATENTS

| | | | |
|---|---|---|---|
| 3,443,833 | 5/1969 | Miller et al. | 296/102 |
| 3,733,103 | 5/1973 | Hansen | 280/756 X |
| 3,757,900 | 9/1973 | Gischlar | 188/1 C |
| 3,768,856 | 10/1973 | Stuller | 280/756 X |

Primary Examiner—Robert R. Song
Assistant Examiner—Michael J. Forman
Attorney, Agent, or Firm—Arthur L. Nelson

[57] ABSTRACT

An energy absorbing joint for a protective frame wherein the energy absorbing joint is allowed to deform as the kinetic energy is absorbed thereby reducing the effect of the impact in the event of vehicle upset. The energy absorbing joint is formed in a connection between a strut which braces the upright columns from the vehicle chassis.

10 Claims, 5 Drawing Figures

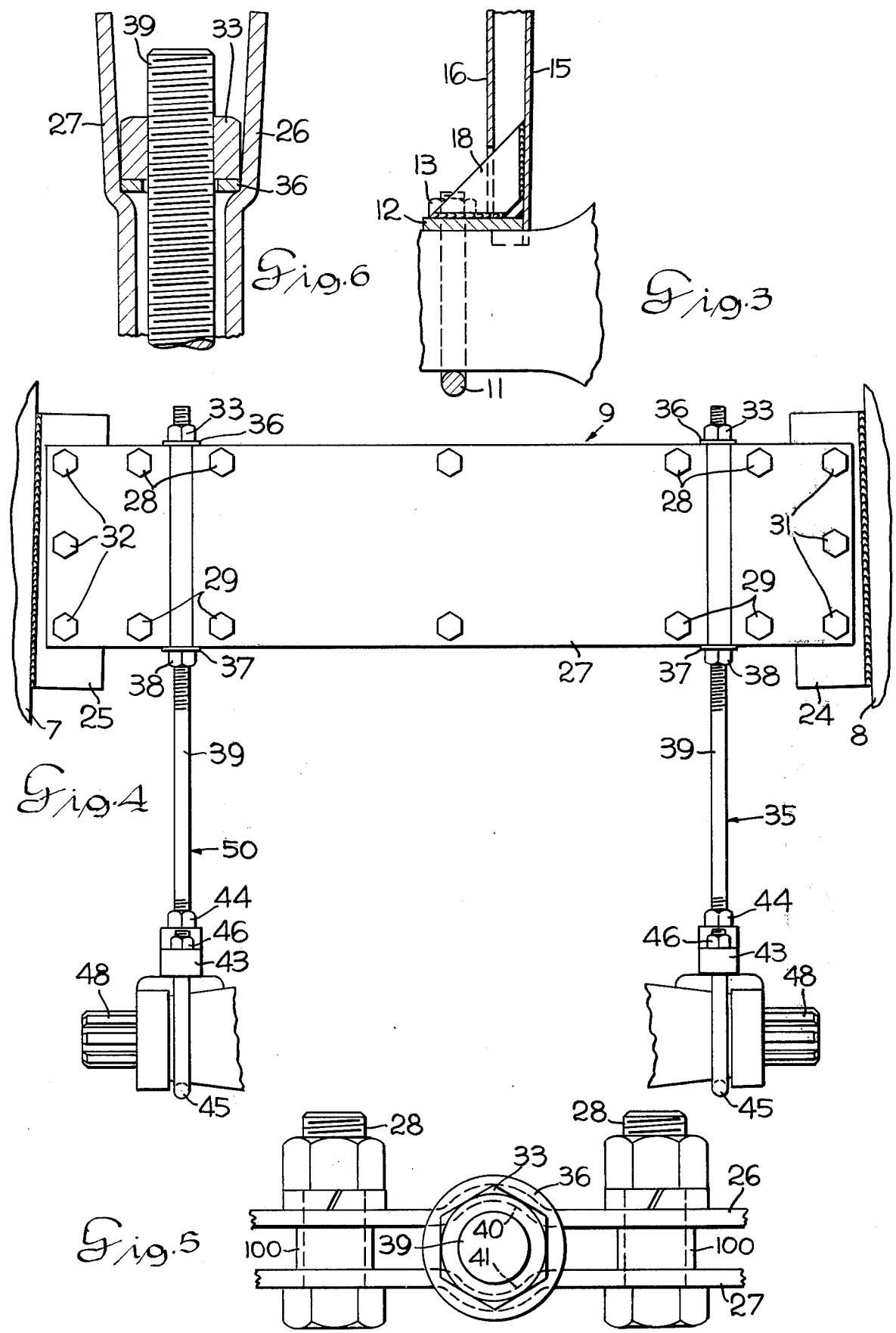

ENERGY ABSORBING JOINT FOR PROTECTIVE FRAME

This invention relates to a protective frame for an operator at the operator station of a tractor, and more particularly to an energy absorbing joint with a deformable means to absorb kinetic energy from impact loading on the protective frame, to reduce the effect of the impact loading on the protective frame, and to protect against failure of the frame for protection of the operator.

Protective frames are used to protect the operator at the operator station of the tractor in event the tractor rolls over. A protective frame which is suddenly subjected to an extreme load such as the weight of the tractor when the tractor is rolled over must absorb the kinetic energy. If the frame is rigid and cannot recoil or deform to absorb the energy of the impact, failure may occur and the operator may be injured. Accordingly, this invention provides for a deformable base and joint which absorb energy as a load is suddenly placed on the protective frame. The protection for the operator is improved while the energy absorbing joint absorbs and dissipates the kinetic energy released during rollover.

It is an object of this invention to provide an energy absorbing joint in a protective frame on the tractor.

It is another object of this invention to provide a protective frame for a vehicle operator station with a deformable base and energy absorbing joint to reduce the effect of impact in the event of rollover of the tractor.

It is a further object of this invention to provide a protective frame around the operator station of a tractor with a cross-member between upright columns forming connecting joints with struts connected to the rear drive assembly housing. Deformation of the joints absorb energy and reduce the effect of impact in the event of rollover of the tractor.

The objects of this invention are accomplished by providing struts connected to the upright columns mounted on the rear axle housings of the tractor. The struts are also connected to the rear drive assembly housing to operate as braces for maintaining the position of the upright columns. The base of the upright columns can deform and the energy absorbing joints also deform while energy is absorbed to reduce the effect of impact loading on the protective frame.

Referring to the drawings, the preferred embodiment of this invention is illustrated.

FIG. 3 illustrates an enlarged view of the mounting of one of the upright columns on the rear drive axle housing;

FIG. 4 is a view showing the cross-member forming energy absorbing joints with the struts which are mounted on the vehicle chassis; and FIG. 5 is an end view of one of the energy absorbing joints.

FIG. 6 is a cross-section view of one of the energy absorbing joints after it has deformed.

Figure 1:
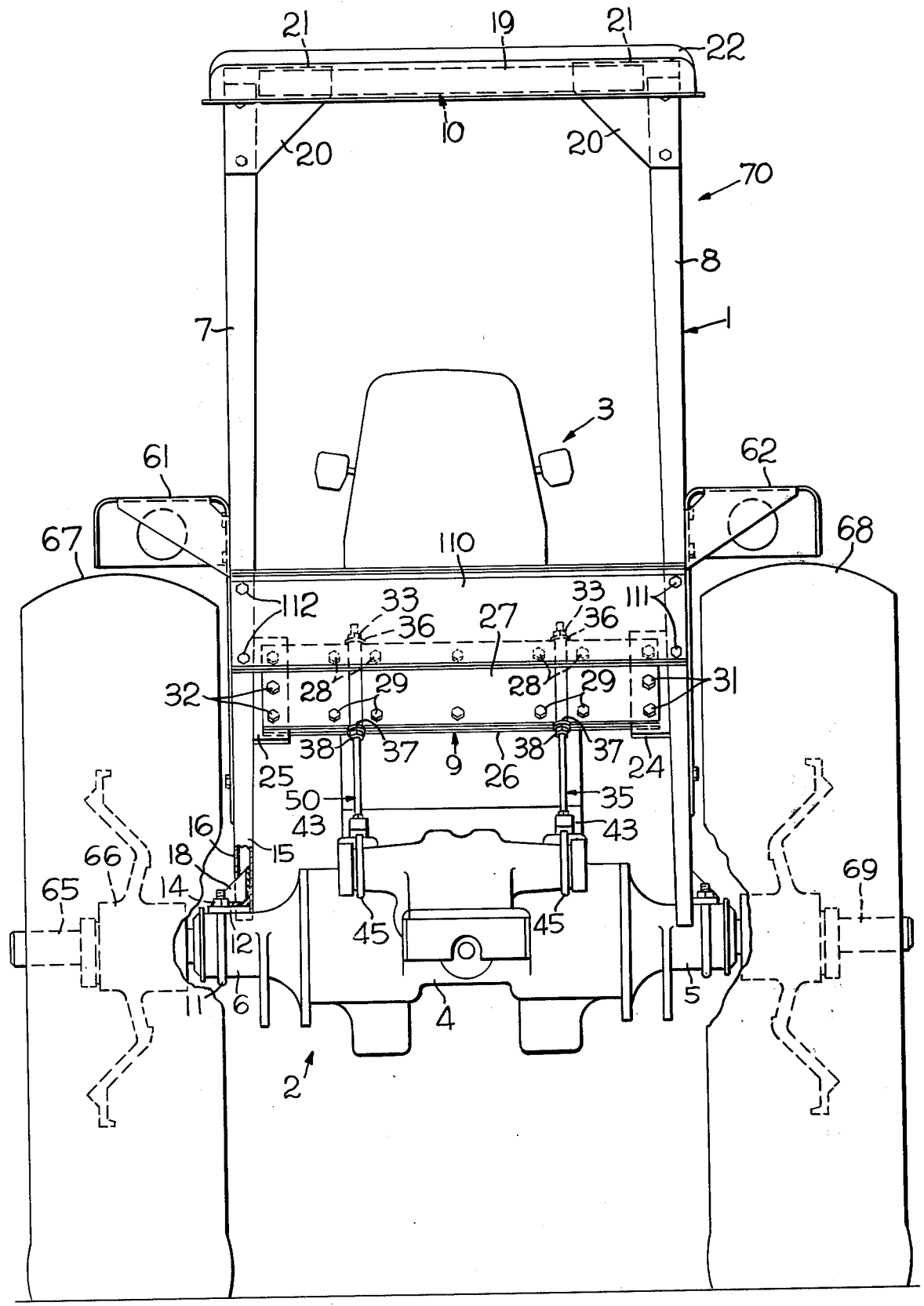
FIG. 1 illustrates a rear view of the protective frame mounted on the tractor.

Referring to the drawings, FIG. 1 illustrates the protective frame 1 mounted on the tractor 2 protecting the operator station 3. The rear drive assembly housing 4 is integral with the rear axle housings 5 and 6 which extend transversely from the rear drive assembly housing. The upright column 7 and the upright column 8 are connected at their lower portions by the cross-member 9. The upper cross-member 10 is connected to the upper ends of the upright columns 7 and 8.

Figure 2:
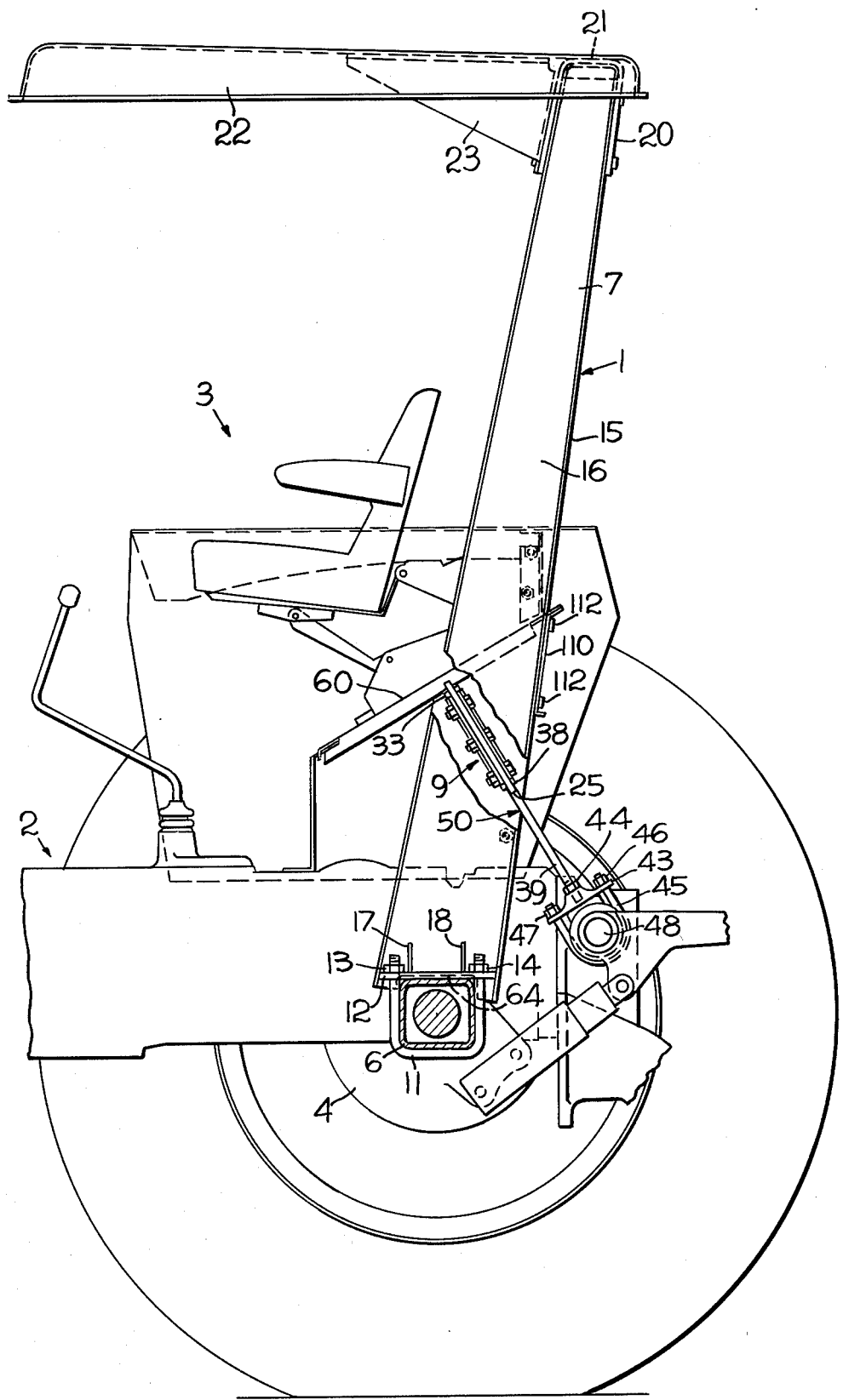
FIG. 2 illustrates a side view of the protective frame and the cross-member connected between the lower portion of the upright columns showing the energy absorbing joint on a strut connected to the vehicle chassis.

FIG. 2 shows the mounting of the upright column 7 on the rear axle housing 6. The U-bolt 11 clamps around the underside of the rear axle housing 6 and is locked on the plate 12 by means of the nuts 13 and 14. The upright column 7 includes a channel 15 which is covered by a plate 16. The base plate 12 is fastened to the channel 15 by the gussets 17 and 18. The fender 61 is mounted on the upright column 7 while the fender 62 is mounted on the upright column 8 as shown in FIG. 1.

The upright column 7 extends upwardly and is connected to a cross-member 10 which includes a channel 19 and a gusset 20 which extends from the channel 19 and forms a horizontal surface 21 for mounting of the canopy 22. The gusset 23 extends forwardly from the upright column 7 to provide support of the cantilever mounting of the canopy 22.

The lower cross-member 9 is mounted on brackets 24 and 25. The cross-member 9 includes two plates, 26 and 27, which are bolted together by a plurality of bolts 28 and 29 carrying spacers 100. The cross-member 9 is fastened to the brackets on the right-hand side by the plurality of bolts 31, and on the left-hand side by the plurality of bolts 32. A plurality of bolts may be positioned intermediate the bolts 28 and 29 to increase the resistance of the nut 33 as it is forced between the plates 26 and 27. Each of the struts 35 and 50 includes a nut 33 on its upper end and a mild steel washer 36 underneath the nut 33. Similarly a mild steel washer 37 is positioned underneath the nut 38. The bolt 39 of the strut 35 is free within the opening formed by the recesses 40 and 41 between which the bolt 39 extends. The strut 35 extends downwardly to form a base 43 which is locked by the lock nut 44 on the bolt 39. The U-bolt 45 and nuts 46 and 47 fasten the strut 35 on the rear drive assembly housing. The U-bolts fasten around the housing for the rock shaft 48 in the rear drive assembly housing of the vehicle chassis.

Seat support bracket 60 is supported by cross-plate 110 and also supported on the platform. Cross-plate 110 is bolted by bolts 112 to upright column 7 and bolted by bolts 111 to upright column 8 to provide strength to the protective frame 1.

Referring to FIG. 6, the deformation of the plates 26 and 27 is shown in which the washer 36 is sheared and the nut 33 slides between the two plates deforming the plates and the energy is absorbed as the nut moves between the two plates. The absorption of energy may be accomplished by movement of the nut 38 or nut 33 in opposing directions, depending upon which direction the upright column 7 is moved during impact.

The operation of the device will be described in the following paragraphs.

The upright columns 7 and 8 are mounted on the rear axle housings 6 and 5. The cross-member 9 is securely fastened to the upright columns 7 and 8. The pair of struts 35 and 50 are connected to the cross-member 9 on the upper end and connected to the rear drive assembly housing on their lower end. The nuts 33 and 38 are tightened to an engaging position on the washers 36 and 37, respectively. The cross-member 9 is locked between these washer and nut assemblies in the normal operating position. When impact loading is placed on the protective frame 1, the linear dimension between the mounting of the struts 35 and 50, and the nuts 33 and 38 is changed thereby causing one of the nuts to press against the end surfaces of the plates 26 and 27. If the load is excessively heavy the upright columns 7 and 8 deform which will force a nut and washer assembly against the end of the plates 26 and 27. If the upright columns 7 and 8 are pressed forwardly, the nut 33 will cause the washer 36 to shear and move inwardly between the plates 26 and 27. As the nut moves between the plates, the plates must be deformed because there is insufficient clearance between the plates normally. Be deformation of the plates, energy is absorbed and the effect of the impact on the protective frame is reduced. The greater the distance the nut 33 has to move between the plates, the greater the energy absorbed by the energy absorbing joint. If a plurality of bolts were positioned between bolts 28 and 29, a greater amount of energy would be absorbed by the joint. The clearance between the plates can be adjusted to absorb greater or lesser amounts of energy, depending on the requirements of the joint. The absorption of energy tends to cushion the impact on the upright columns 7 and 8, and this in turn will reduce the likelihood of failure of the protective frame. It also provides a measure of resilience for the operator to reduce the impact felt by the operator and may reduce the possibility of injury incurred by the operator. A plurality of energy abosrbing joints can be installed on the cross-member depending on the amount of load to be sustained by the device. As indicated previously, the amount of clearance between the plates can also be varied, by varying the height of the spacer 100, or the depth of the recesses formed in the plates by the size of the bolts, nuts and so on. The specific details are dictated by the requirements of the protective frame and the energy absorbing joints and struts.

The embodiments of the invention in which an exclusive property or privilege is claimed are defined as follows:

1. A vehicle having a protective frame extending above an operators station comprising, a vehicle chassis, a protective frame mounted on said vehicle chassis including, a pair of upright columns, a support connected to and extending between said upright columns, at least one strut mounted on said vehicle chassis, an energy absorbing joint connecting said strut to said support, said joint including deformable members of said support mounted in spaced relation and forming an opening in said support, an end portion of said strut extending through said opening, an enlargement on said strut at each end of said opening engaging the opposing sides of said members to brace said support, said enlargements thereby deforming said members and enlarging said opening when said upright columns are deformed due to overturning of the vehicle.

2. A vehicle having a protective frame as set forth in claim 1 wherein said support defines a cross-member, means bolting said cross-member to both of said upright columns.

3. A vehicle having a protective frame as set forth in claim 1 wherein said strut defines a bolt.

4. A vehicle having a protective frame as set forth in claim 1 wherein said strut defines a bolt, each of said enlargements define a nut on opposing sides of said members.

5. A vehicle having a protective frame as set forth in claim 1 including at least two of said struts.

6. A vehicle having a protective frame as set forth in claim 1 wherein each of said members defines a plate.

7. A vehicle having a protective frame as set forth in claim 1 wherein said chassis includes a pair of rear drive axle housings for supporting said upright columns, a rear drive assembly housing supporting said strut.

8. A vehicle having a protective frame as set forth in claim 1 including a plurality of bolts extending through said members adjacent the side opening in said energy absorbing joint.

9. A vehicle having a protective frame as set forth in claim 1 wherein said strut defines adjustable means for adjusting the length of the strut for supporting said protective frame in a predetermined position.

10. A vehicle having a protective frame as set forth in claim 1 including means positioning said upright columns in a rearwardly inclined position, at least two struts including means positioning said struts in a forwardly inclined position for connection with said upright columns through said support for resisting rearward or forward movement in the event of vehicle overturn.

* * * * *